(12) United States Patent
Li

(10) Patent No.: US 8,835,546 B2
(45) Date of Patent: Sep. 16, 2014

(54) FINISHING GLAZE FOR DECORATIVE TEXTURING MEDIUM

(75) Inventor: Donghong Li, Buffalo Grove, IL (US)

(73) Assignee: United States Gypsum Company, Chicago, IL (US)

( * ) Notice: Subject to any disclaimer, the term of this patent is extended or adjusted under 35 U.S.C. 154(b) by 732 days.

(21) Appl. No.: 12/502,337

(22) Filed: Jul. 14, 2009

(65) Prior Publication Data

US 2010/0016479 A1 Jan. 21, 2010

Related U.S. Application Data

(60) Provisional application No. 61/081,807, filed on Jul. 18, 2008.

(51) Int. Cl.
| | | |
|---|---|---|
| *C09D 133/00* | (2006.01) | |
| *C09D 175/04* | (2006.01) | |
| *C09D 125/06* | (2006.01) | |
| *C08L 33/08* | (2006.01) | |
| *C09D 133/08* | (2006.01) | |
| *C09D 127/06* | (2006.01) | |
| *C08L 91/08* | (2006.01) | |
| *C08L 1/00* | (2006.01) | |
| *C08L 75/04* | (2006.01) | |

(52) U.S. Cl.
CPC ......... *C09D 127/06* (2013.01); *C08L 2205/035* (2013.01); *C09D 133/08* (2013.01); *C08L 33/08* (2013.01); *C08L 91/08* (2013.01); *C08L 1/00* (2013.01); *C08L 2205/02* (2013.01); *C08L 75/04* (2013.01)
USPC ............. 524/500; 524/501; 524/502; 524/35; 524/275; 524/560; 524/577

(58) Field of Classification Search
USPC ............ 524/500, 501, 502, 275, 35, 560, 577
See application file for complete search history.

(56) References Cited

U.S. PATENT DOCUMENTS

| | | | | |
|---|---|---|---|---|
| 3,356,627 | A | * | 12/1967 | Scott .............................. 524/516 |
| 5,700,522 | A | * | 12/1997 | Nonweiler et al. ......... 427/388.4 |
| 5,753,742 | A | * | 5/1998 | Bumanlag ..................... 524/501 |
| 5,939,514 | A | * | 8/1999 | Brown et al. ................... 528/229 |
| 6,608,131 | B1 | * | 8/2003 | Winterowd et al. .......... 524/487 |
| 6,890,584 | B2 | * | 5/2005 | Leenders et al. ................ 427/58 |
| 7,078,455 | B2 | | 7/2006 | Heldmann et al. |
| 2009/0298968 | A1 | * | 12/2009 | Bury et al. .................... 523/122 |

FOREIGN PATENT DOCUMENTS

| | | |
|---|---|---|
| EP | 1 577 438 | 9/2005 |
| EP | 1 642 941 | 4/2006 |

* cited by examiner

*Primary Examiner* — Satya Sastri
(74) *Attorney, Agent, or Firm* — Greer, Burns & Crain, Ltd.; Pradip Sahu; Philip T. Petti

(57) ABSTRACT

A glaze composition for application to a substrate includes a dry powder latex, a liquid latex emulsion, a coalescing solvent, a wax, a thickener and water. The glaze is rewettable during application and is extremely durable after fully dry. Optionally, the glaze also includes one or more of a surfactant, a dispersant, one or more pigments, a dispersant, a defoamer, a slow drying solvent, and a slow drying hydrocarbon resin.

19 Claims, No Drawings

FINISHING GLAZE FOR DECORATIVE TEXTURING MEDIUM

CROSS REFERENCE TO A RELATED APPLICATION

This reference claims the benefit under 35 U.S.C. §119(e) of U.S. Provisional Ser. No. 61/081,807, entitled "Finishing Glaze for Decorative Texturing Medium," filed Jul 18, 2008, herein incorporated by reference.

BACKGROUND

A current trend in interior design is to use multiple faux finishes for decorative purposes on walls or ceilings. One faux finish technique is to use a pliable, plaster-like decorative composition to form textures or architectural details. Decorative compositions used for this purpose should be very strong, water-resistant and durable, and are shapeable, such as by troweling the composition to form details. A particularly desirable decorative composition is useful for repair of walls and ceilings, as well as being used for decorative purposes.

Once the texture or architectural details are formed, sometimes it is desirable to impart a glaze to the surface of the decorative composition. The glaze is useful for changing the look of the surface, making it shiny or introducing a color to the surface. It can also impart durability and water-resistance to the substrate surface.

Formulation of such a glaze is not easy. Customers prefer a water-based composition for less odor and ease in cleaning rollers, brushes or other tools after application is complete. Water tends to dry from the glaze relatively quickly, giving the applicator little time where the glaze is workable. Further, in the area where the glaze is being applied, the edges tend to dry more quickly than the center of the area. This is because the glaze tends to be spread thinner at the edges. If color has been added to the glaze, the color sets at the edges where the glaze dries, making it obvious where areas of application overlap. The water can also be absorbed into the substrate at inconsistent rates, leaving the color inconsistent and uneven, particularly on a porous surface.

Thus it would be advantageous to have a glaze composition that takes color and allows it to be uniformly applied to a substrate surface. There would be additional benefits to having a glaze with an increased open time so that the glaze can be adequately applied before it dries. It is also advantageous if the tools used to apply the glaze could be cleaned with water.

SUMMARY OF THE INVENTION

At least one of these advantages is met or exceeded by a water-based glaze having an improved open time and is rewettable to allow blending of the edges of an application area. More specifically, the glaze composition includes at least two latex polymers. One of the latex polymers is a dry powder latex and the other is a liquid latex emulsion. A coalescent solvent selected to promote film formation of the latex solids is also present in the glaze. A wax or wax emulsion is added. Proper consistency is achieved by the addition of a thickener. All of the components are dispersed in water prior to application. Since the composition is an aqueous system, tools are easily cleaned with water.

The combination of these latex polymers forms the base for a glaze that is useful for application to a substrate or a coating on the substrate, such as gypsum wallboard panels, joint compound, sprayable plasters, decorative compositions and the like. The glaze is rewettable during application. If the glaze in one application area dries prior to its application in adjacent application areas, overlap of the fresh, pliable glaze onto the dried area rewets it. This allows for blending of the glaze in the overlapped areas. If the glaze changes color upon drying, rewetting of the dried area also allows for the blending of the colors.

Another quality of the present glaze is that it imparts a high durability to the underlying surface after it is fully dry. Some popular faux finishes are not necessarily durable. Application of the present glaze can protect the surface to which it is applied, adding to the aesthetic lifetime of the finish.

As the glaze can be made to be transparent or colored as desired, it is also useful for adding to the aesthetic beauty of the substrate finish. Translucent or opague colored glaze is obtainable by choosing appropriate dyes, tints or pigments. For example, a translucent glaze can be applied over a finished surface to add depth or shading to the color.

DETAILED DESCRIPTION OF THE INVENTION

A clear glaze composition is prepared for application to a substrate such as a decorative composition. As prepared, the glaze is a thin, clear liquid that can be applied to the substrate using a brush, roller, sprayer or sponge. An example of a preferred substrate is DIVINO® brand Texturing Compound marketed by United States Gypsum Co. of Chicago, Ill. This base compound is initially shapeable then hardens to a permanent shape, similar to a joint compound. In the discussion below, all amounts are expressed in terms of weight or weight percent based on the total composition weight.

The glaze includes at least two latex polymers. One of the polymers is a dry, rewettable, latex powder. In addition to providing flexibility to the glaze, the latex powder gives the glaze composition the ability to be rewet for ease of application. The glaze is preferably applied in small, overlapping patches and spread to a thin coating. Edges of the thin coating tend to dry prior to the center of the patch. During application of an adjoining patch, reapplication of the glaze over the previously dried edges rewets the edge, blending it into the wet glaze. Blending the edges together in this manner also evens the color if the glaze is colored. Preferred dry latex powders include acrylic resin, styrene acrylic resin, polyurethane resin or combinations thereof. One example of a suitable latex powder is VINNAPAS 8034H dry powder latex from Wacker Chemie AG. Amounts of the dry latex powder vary from about 3% to about 8% based on total formulation weight.

The second latex polymer is a liquid latex emulsion. Any acrylic latex is suitable as the latex emulsion. Amounts of the liquid latex emulsion range from about 4% to about 10% based on the total formulation weight. This latex component adds to the strength of the glaze by providing strong filaments. An example of a suitable latex emulsion is RHOPLEX HG-95G® brand acrylic polymer latex emulsion (Rohm & Haas, Philadelphia, Pa.). Selection of the relative amounts of the dry latex powder and the liquid latex emulsion for a particular application is a trade off between the number of strong filaments and the rewettability of the glaze.

A coalescing solvent is present in the glaze. This solvent is defined as one that promotes film formation of the latex solids. In some embodiments, the coalescing solvent is present in amounts of about 0.1% to about 1.0% based on total formulation weight. At least one preferred coalescing solvent is TEXANOL® brand ethyl alcohol of Eastman Chemicals of Kingsport, Tenn.

Another important component of the glaze is a wax. The wax imparts a thick, smooth and creamy texture to the glaze and makes it easier to apply. Plain and powdered waxes are suitable, but take time to blend into the glaze mixture. Paraffin waxes are preferred. Synthetic waxes, such as polyethylene emulsions, are less desirable. In preferred embodiments, the wax is present in a wax emulsion that includes the wax and a surfactant in an aqueous carrier. Wax emulsions are easier to mix or blend compared to pure solid waxes. Liquid waxes are also preferred for use in the glaze composition.

Preferred amounts of wax vary from about 1% to about 3% based on total formulation weight. Where the wax emulsion is used, only the weight of the wax solids is used to measure the amount of wax to be added. The molecular weight of the wax preferably ranges from about 280 to about 600 Daltons. An exemplary wax emulsion is AQUACER® 539 brand wax emulsion, a nonionic, aqueous emulsion of a wax mixture melting at 90° C. (BYK USA, Wallingford, Conn.).

A thickener is added to give the glaze body and make it easier to apply. The amount of thickener added is an amount sufficient to provide a viscosity sufficient to hold the glaze on the substrate, yet allow for easy application. Cellulosic thickeners, such as BERMOCOLL® 481 FQ brand thickener (Akzo Nobel Surface Chemistry AB, Stenungsund, SE) are preferred. The use of other thickeners is contemplated, including BERMOCOLL 431, BERMOCOLL 411 and BERMOCOLL 451. BERMOCOLL® brand thickeners are ethyl and ethylene oxide substituted cellulose ethers.

A surfactant is optionally added to reduce beading by reducing surface tension. A low or non-foaming surfactant, such as a nonionic surfactant, is preferred. An exemplary surfactant is TRITON® CF-10 brand nonionic surfactant (Dow Chemical Co., Midland, Mich.). The amount of the surfactant ranges from about 0.2% to about 0.5% based on total formulation weight.

Bubbles present in the glaze can dry onto the wall or leave a ring where the bubble burst. Foam can be generated during mixing, particularly in a high speed process where high shear mixing can be used. The surfactant present in the wax emulsion can contribute to foaming as well. To eliminate bubbles, an optional defoamer is added to the glaze composition. A preferred defoamer includes a filmed silica with a hydrocarbon oil. Silicone-type defoamers are not preferred. DEE FO® 542 brand defoamer by Ultra Additives, Inc. (Bloomfield, N.J.) is an example of a preferred defoamer. Defoamers are used in amounts of about 0.1% to about 0.5% based on total formulation weight.

If the glaze is prepared for immediate use, spoilage does not pose a problem. However, commercially prepared products tend to reside in their packaging for long periods of time during storage, shipping and on the retailer's shelf. If the products include moisture and components edible by microbes, growth of mold and bacteria can occur. Where the glaze is packaged for later consumption, optional biocides are useful to deter the growth of microbes until it is ready for use. Any known in-can preservatives are suitable for use in the glaze, such as MERGAL® 174 brand preservative Troy Corporation, Florham, N.J.). Any effective amount of biocide is useful. Preferably the biocide is present in amounts of from 0.1% to about 0.5% based on total formulation weight.

Optionally, the pH is adjusted to enhance desirable properties. An alkaline environment assists the biocide to reduce microbial growth. Lower pH in the acid range produces a glaze that is easier with which to work. Any compound that adjusts pH can be added to the glaze as long as it is compatible with other glaze components. In some embodiments, ammonia or AMP-95 (Dow Chemical, Midland, Mich.) are used as pH adjusters. The pH adjuster is used in amounts necessary to obtain the desired pH.

A slow drying resin, such as VERSADIL® 100 brand diluent (Neville Chemical Co., Pittsburgh, Pa.), is added to the glaze. This is a low molecular weight hydrocarbon resin that acts as a solid, non-reactive diluent. It slows the drying process, adding to the open time of the glaze. The slow drying resin is used in amounts of about 1% to about 3% based on total formulation weight.

Addition of an optional slow drying solvent is useful where it is desirable to further extend the open time of the glaze. Preferably the slow drying solvent is used in amounts of about 4% to about 8% based on total formulation weight. The extension of the open time depends on exact choice of the slow drying solvent. Ethylene glycol (Dow Chemical, Midland Mich.) is a preferred slow drying solvent. If a longer open time is desired, propylene glycol, dipropylene glycol or butylene glycol can be used in place of the ethylene glycol.

Using the components described above, the glaze produced is transparent, allowing the color of the substrate to show through. Color is optionally imparted to the glaze by the addition of tints, dyes, pigments or combinations thereof. Common pigments, such as zinc oxides, mica or titanium oxides, are usable, as well as metallic or other well known pigments. Combinations of tints, dyes and pigments are also contemplated.

A dispersing agent is optionally added to improve the stability of the glaze for an improved shelf-life. If solid pigments are used, the dispersing agent also aids in dispersing of the solid pigments. Pigments are often available as fine powders that tend to float on the surface as the glaze is prepared. The dispersing agent helps to wet the powder allowing it to be incorporated more rapidly into the glaze. Any type of dispersing agent may be used, however polymeric dispersants are particularly effective. A preferred dispersing agent is TAMOL 731A (Rohm & Haas, Philadelphia, Pa.), which is a maleic acid copolymer. The dispersing agents are preferably used in amounts of about 0.1% to about 1% based on total formulation weight.

Water is present as a carrier in amounts of about 60% to about 75 wt % based on the total weight of the glaze. The water should be as clean as practical to maintain the clarity of the finished glaze.

EXAMPLE

A water-based glaze was prepared using the components of Table I. The amounts were measured in weight.

TABLE I

| Material | Manufacturer | Function | Amount | Wt % |
|---|---|---|---|---|
| VINNAPAS 8034H | Wacker Chemie | Dry Powder Latex | 110 | 6.0% |
| RHOPLEX HG-95G | Rohm & Haas | Latex Emulsion | 120 | 6.5% |
| AQUACER 539 Wax | BYK Chemie | Wax Emulsion | 93 | 5.1% |
| BERMOCOLL 481 FQ | Akzo Nobel | Thickener | 11 | 0.60% |
| Ethylene Glycol | Dow Chemical | Slow Drying Solvent | 115 | 6.2% |
| TAMOL 731A | Rohm & Haas | Dispersing Agent | 10 | 0.54% |
| TRITON CF-10 | Dow Chemical | Surfactant | 6 | 0.32% |
| DEE FO 542 | Ultra Additives, Inc. | Defoamer | 6 | 0.32% |

TABLE I-continued

| Material | Manufacturer | Function | Amount | Wt % |
|---|---|---|---|---|
| TEXANOL | Eastman Chemical | Coalescing Solvent | 10 | 0.54% |
| MERGAL 174 | Troy Corporation | Biocide | 4 | 0.21% |
| AMP-95 | Dow Chemical | pH Adjuster | 2 | 0.10% |
| VERSADIL 100 | Neville Chemical | Slow Drying Resin | 50 | 2.7% |
| Water | | Carrier | 1300 | 70.7% |

The glaze was prepared by first adding water into a paint-making type mixer. The dry powder latex and thickener were then added slowly, mixing for about 5-10 minutes to break down the dry chuck powders. The pH adjuster was added, mixing with increased speed. Next, the dispersing agent, surfactant, defoamer, biocide, ethylene glycol, latex emulsion, coalescing solvent and wax emulsion were added to the solution to form the glaze. The glaze was checked to ensure the desired dispersion was achieved with no small particles or grit. The slow dry resin was added under low speed. After the viscosity was checked, the glaze was placed into containers for later use.

The resulting glaze was applied to a porous surface. It had high workability. When dry, the glaze had a low to eggshell sheen finish and imparted water resistance to the finished article.

While a particular embodiment of the finishing glaze has been shown and described, it will be appreciated by those skilled in the art that changes and modifications may be made thereto without departing from the invention in its broader aspects and as set forth in the following claims. Unless otherwise noted, combinations of optional components with any or all other options are contemplated.

What is claimed is:

1. A glaze composition for application to a substrate, comprising:
    a rewet latex powder selected from the group consiting of acrylic resins, styrene acrylic resins, polyurethane resins and combinations thereof;
    a liquid latex emulsion;
    a coalescing solvent;
    a wax or a wax emulsion comprising a wax and a surfactant in an aqueous carrier;
    a thickener; and
    water.

2. The composition of claim 1 further comprising a surfactant.

3. The composition of claim 2 wherein said surfactant is present in amounts from about 0.2% to about 5% of the total composition weight.

4. The composition of claim 1 further comprising a defoamer.

5. The composition of claim 4 wherein said defoamer is present in amounts from about 0.1% to about 0.5% of the total composition weight.

6. The composition of claim 1 further comprising ethylene glycol in amounts from about 4% to about 8% of the total composition weight.

7. The composition of claim 1 further comprising pigments, tints, dyes and combinations thereof.

8. The composition of claim 1 further comprising a preservative.

9. The composition of claim 7 further comprising a dispersing agent.

10. The composition of claim 9, wherein said dispersing agent is present in amounts from 0.1% to about 1% of the total composition weight.

11. The composition of claim 1 wherein said water is present in amounts from about 60% to about 75% of the total composition weight.

12. The composition of claim 1 wherein said dry latex powder is present in amounts from about 3% to about 8% of the total composition weight.

13. The composition of claim 1 wherein said liquid latex emulsion is present in amounts from about 4% to about 10% of the total composition weight.

14. The composition of claim 1 wherein said wax is a paraffin wax.

15. The composition of claim 1 wherein said wax is present in amounts from about 1% to about 3% of the total composition weight.

16. The composition of claim 1 wherein said wax has a molecular weight of from about 280 Daltons to about 600 Daltons.

17. The composition of claim 1 wherein said thickener comprises a cellulosic thickener.

18. A glaze composition for application to a substrate, said glaze comprising:
    a rewet latex powder selected from the group consisting of acrylic resins, styrene acrylic resins, polyurethane resins and combinations thereof in amounts from about 3% to about 8%,
    a liquid latex emulsion in amounts from about 4% to about 10%;
    a coalescing solvent in amounts from about 0.1% to about 1.0%;
    a wax or a wax emulsion comprising a wax and a surfactant in an aqueous carrier in amounts from about 1% to about 3%;
    a thickener in amounts sufficient to hold the glaze on the substrate;
    a surfactant in amounts from about 0.2% to about 0.5%;
    a defoamer in amounts from about 0.1% to 0.5%;
    a slow-drying solvent in amounts from about 4% to about 8%; and
    water in amounts of about 60% to 75%, all amounts by weight based on the total composition weight.

19. A glaze composition for application to a substrate, said glaze comprising:
    a dry powder latex selected from the group consisting of acrylic resins, styrene acrylic resins, polyurethane resins and combinations thereof;
    a liquid latex emulsion;
    a coalescing solvent;
    one of a paraffin wax and a wax emulsion comprising a wax and a surfactant in an aqueous carrier;
    a cellulosic thickener;
    a nonionic surfactant;
    a defoamer comprising a hydrocarbon oil;
    a slow-drying solvent selected from the group consisting of ethylene glycol, propylene glycol, dipropylene glycol and butylene glycol; and
    water.

* * * * *